United States Patent [19]

Pellegri

[11] 4,287,032

[45] Sep. 1, 1981

[54] PROCESS FOR GENERATING A HALOGEN WITH NOVEL ELECTRODES

[75] Inventor: Alberto Pellegri, Luino, Italy

[73] Assignee: Oronzio deNora Impianti Elettrochimici S.p.A., Milan, Italy

[21] Appl. No.: 121,414

[22] Filed: Feb. 14, 1980

[30] Foreign Application Priority Data

Aug. 1, 1979 [IT] Italy ................................ 24829 A/79

[51] Int. Cl.$^3$ ........................ C25B 1/24; C25B 11/04; C25B 11/08; C25B 11/10
[52] U.S. Cl. .................................... 204/128; 204/266; 204/292; 204/294; 204/282; 204/290 R
[58] Field of Search ............... 204/128, 252, 266, 282, 204/291, 292, 294, 290 R

[56] References Cited

U.S. PATENT DOCUMENTS

| | | | |
|---|---|---|---|
| 3,385,780 | 5/1968 | Feng ................................... | 204/291 |
| 4,197,367 | 4/1980 | Deborski ............................ | 204/292 |

FOREIGN PATENT DOCUMENTS 1226507  3/1971  United Kingdom ..................... 204/282

Primary Examiner—Howard S. Williams
Attorney, Agent, or Firm—Hammond & Littell, Weissenberger and Muserlian

[57] ABSTRACT

An improved electrode comprising a pulverulent electroconductive material bonded together with a fluorocarbon polymer having a hydrophilic surface, an electrode-membrane of a solid polymer electrolyte type, an electrolysis cell equipped with said electrodes and an improved method of electrolyzing alkali metal brines to produce halogen.

17 Claims, No Drawings

PROCESS FOR GENERATING A HALOGEN WITH NOVEL ELECTRODES

STATE OF THE ART

Electrolysis of a salt solution such as aqueous alkali metal chloride solution to generate a gas such as chlorine is well known and widely practiced. A recently developed method of conducting such an electrolysis reaction involves the use of a cell provided with a solid polymer electrolyte acting as an ion-exchange membrane with porous, electrocatalytic electrodes comprised of finely divided powders of suitable catalysts, directly embedded on at least one of the two surfaces of the ion-exchange membrane. Such electrodes consist essentially of a thin porous layer of powders of electrocatalytic and electroconductive materials having a thickness normally in the range of from 30 to 300 μm and the binder used to bond the powder or mixture of powders onto the surfaces of the membrane is a usually fluorinated polyolefin such as polytetrafluoroethylene (PTFE).

The electrolysis current is carried and distributed to the electrodes embedded on the membrane surfaces by mechanical contact with suitable current distributors or collectors, generally consisting of metallic screens or meshes kept in contact with the electrodes by applying a small pressure on said screens or meshes.

The solid polymer electrolyte cells afford an almost-complete elimination of the ohmic drops due, in the traditional cells, to ionic conduction across the anolyte and the catholyte between the electrodes and the ion-exchange membrane. As a matter of fact, in the solid polymer electrolyte cells, contrary to what takes place in the traditional cells, the electrodic oxidation and reduction occur substantially at the interface between the porous anode of the cell and the solid polymer electrolyte, and at the interface between the solid polymer electrolyte and the porous cathode of the cell, respectively. Therefore, the ionic conduction occurs practically only across the thickness of the ion-exchange membrane, which thus represents the solid polymer electrolyte between the electrodes of the cell.

The saving in terms of cell voltage with respect to a traditional cell is generally on the order of 0.5–1.0 V. This gain in cell voltage, besides being due to the practical minimization of the interelectrodic gap, depends upon other factors such as the large real active surface of the porous electrodes, the actual insensitiveness of the membrane-embedded porous electrodes to gas-blanketing by the gas bubbles evolving at the active electrode surface and an even current distribution through the solid electrolyte, which is in fact crossed by parallel and uniformly distributed electric field lines.

The procedure normally used to form the electrodes consists essentially in blending the powder of catalytic material or a mixture of said powder with powders of one or more electroconductive materials with an emulsion of PTFE particles in water or other suitable emulsifiable solvent. The powdered binder, that is PTFE, is present in the powder mixture in amounts varying between 16 and 30% by weight, preferably 20% and the powders of the electrocatalytic materials must be as fine as possible.

It has been observed that the surface of the catalytic particles as determined by the nitrogen adsorption method should be at least 25 m² per gram of material, and preferably between 50 and 150 m²/g. The emulsifiable solvent must be free from hydrocarbons or other organic surfactants, as their presence entails a loss of active catalyst surface, that is the surface of the formed electrodes.

The mixture is then spread on a casting surface such as a supporting metal plate, preferably titanium or other valve metal, to form as uniform a layer as possible, and is then heated to evaporate the emulsifying medium. The particle layer is then covered with a thin aluminum foil and pressed in a heated press at about 350° C. under a pressure of 500–600 psi over a period of 1 to 4 minutes. The aluminium foil is then leached away with caustic and the thin electrode preformed on the titanium or other valve metal support is then applied to the membrane surface and pressed in a heated press at about 1000–3000 psi at a temperature of 280–350° C. over a period of 5–40 seconds, to bond the thin electrode onto the surface of the membrane. The titanium plate is then removed and is ready for use for the formation of more electrodes.

The use of PTFE or other fluorinated olefins as binders to form the electrodes in solid electrolyte cells entails some disadvantages particularly when the electrolysis conditions are such as to give rise to possible concurrent side-reactions together with the main reaction at the electrode. This is, for example, the case in the electrolysis of alkali metal brines. For instance, in the electrolysis of sodium chloride, the reactions taking place at the various parts of the cell are the following:

main reaction at the anode:

$$2Cl^- \rightarrow Cl_2 + 2e^-$$

transport across the membrane:

$$2Na^+ + H_2O$$

reaction at the cathode:

$$2H_2O \rightarrow 2OH^- + H_2 - 2e^-$$

$$2Na^+ + 2OH^- \rightarrow 2NaOH$$

side reaction at the anode:

$$4OH^- \rightarrow O_2 + 2H_2O + 4e^-$$

main overall reaction:

$$2NaCl + 2H_2O \rightarrow 2NaOH + H_2 + Cl_2$$

Therefore at the anode, besides the desired main reaction of chlorine discharge, a certain water oxidation reaction occurs to a lesser extent with consequent oxygen evolution. This trend to oxygen evolution is particularly enchanced by the alkaline environment at the active sites of the anode consisting of the catalyst particles contacting the membrane. In fact, cation-exchange membranes suitable for the electrolysis of alkali metal halides have a transfer number different from the unity and, in conditions of high alkalinity in the catholyte, they allow some migration of hydroxy anions from the catholyte to the anolyte across the membrane.

The oxygen evolution at the anode, besides causing a lowering of the faraday efficiency and contaminating the chlorine gas produced, may have detrimental effects on the electrode itself, particularly if the electrode also comprises graphite. To reduce oxygen evolution, it is a common practice to acidify the anolyte to neutralize the hydroxyls to produce water. Moreover, in solid polymer electrolyte cells, the porous layer constituting the anode of the cell must be as thin as possible to permit an effective transfer of chloride ions to the active sites of the electrode.

However, the use of fluorinated polyolefins as binders in the electrodes of a solid polymer electrolyte cell makes the electrodes substantially hydrophobic which characteristic is highly detrimental to an efficient mass transfer in the aqueous phase from the bulk of the electrolyte to the active sites within the porous electrodes as is required in brine electrolysis. On the other hand, practice has demonstrated a distinct superiority of such binders, especially PTFE, in terms of coherence and durability of the electrodes under the extremely harsh electrolysis conditions at temperatures of about 70°-85° C.

OBJECTS OF THE INVENTION

It is an object of the invention to provide an improved electrode with hydrophilic properties for use in solid polymer electrolyte cells and to provide a novel membrane-electrode.

It is a further object of the invention to provide a method for generating a halogen by the electrolysis of an alkali metal halide brine in a solid polymer electrolyte cell embodying the improved electrodes of the invention with high current efficiency.

It is an additional object of the invention to provide a novel solid polymer electrolyte cell containing the said electrode membrane.

These and other objects and advantages of the invention will become obvious from the following detailed description.

THE INVENTION

The novel electrode of the invention is comprised of a pulverulent electroconductive, electrocatalytic material bonded together with a fluoroolefin polymer having a hydrophilic surface. The said polymers are an outstanding binder for the making of a porous electrode structure which is perfectly wettable by the aqueous electrolyte and is more readily permeable for brine electrolysis.

The fluorinated polyolefin powder containing hydrophilic groups is preferably obtained by subjecting a suspension of the polymer to a radiation field of a linear electron accelerator or of a γ-ray source such as Cobalt 60 in presence of a precursor compound of hydrophilic groups such as, for example, ammonium sulphite, sodium nitrite, ammonium carbonate, potassium nitrate, water, air, etc. The precursor substance in contact with the polymer powder during the irradiation provides the polymer with hydrophilic groups such as: $-NO_2$, $-CN$, $-COX$, $-OR$, $-SO_3H$, $-COOR$, $-COOH$, $-OH$, $-X$ wherein X is Cl, Br or I and R is alkyl of 1 to 7 carbon atoms.

These hydrophilic groups are preferably present in very small concentration in the modified polymer, but this small concentration is sufficient to make the electrodes very wettable. Moreover, it has been found that using the modified polymer of the invention as the binder in forming the electrodes described above in place of the unmodified polymer of the prior art, there is no detectable loss of catalytic activity or of mechanical stability of the bonded electrodes. It is believed that the hydrophilic groups become generated and/or attached to the surface of the polymer particles during the irradition treatment, thereby making the surface of the fluorinated polyolefin, which is per se hydrophobic, readily wettable by the aqueous salt solution. On the other hand, the bulk structure of the fluorinated polyolefin remains substantially unchanged and the polymer maintains its chemical resistance and thermal characteristics substantially unaltered.

The electroconductive and electrocatalytic materials are those typical of the known art in the field of alkali metal brine electrolysis with solid polymer electrolyte cells and include metals of the platinum groups and oxides thereof including mixed oxides thereof and mixtures of these catalytic materials with valve metals or oxides, optionally mixed with other electroconductive materials such as, for instance, graphite as conductive extenders. Examples of suitable materials are described in U.S. Pat. No. 3,711,385 and No. 3,632,498. Thus, a typical composition of such a mixture may comprise, for example, mixed oxides of ruthenium, iridium and titanium in weight ratios of 0.75: 0.25:1, eventually containing up to 50% by weight of graphite.

Distinctive of the invention is the presence in the mixture of electroconductive and electrocatalytic materials of a fluorinated polymeric binder bearing hydrophilic groups that imparts to the electrode produced by sintering said mixture an excellent wettability by aqueous solutions such as the alkali metal halide brines. The use of such a hydrophilic binder permits conducting the electrolysis of alkali metal halide electrolytes in solid polymer electrolyte cells with high anode and cathode current efficiencies, thus overcoming the above mentioned disadvantages resulting from the use of hydrophobic binders such as unmodified polytetrafluoroethylene.

The fluorinated polymeric hydrophilic binder of the invention is obtained by grafting polar hydrophilic groups onto the surface of a fluorinated polymeric matrix such as polytetrafluoroethylene. The hydrophilic groups grafted on the fluoropolymer matrix thus impart a hydrophilic character to the surface of the PTFE binder which is otherwise hydrophobic, rendering it wettable by the acqueous electrolyte.

As discussed above, hydrophilic groups may be grafted to the fluorocarbon polymer by any suitable technique. In the case of a fully fluorinated polyolefin such as PTFE, the preferred method comprises irradiation of the polymer with high energy electrons or with γ-rays in the presence of a substance capable of providing the hydrophilic groups. In the case of a fluorinated polyolefin containing other halogens besides fluorine such as polychlorotrifluoroethylene (PCTFE) or polybromotrifluoroethylene (PBTFE) or copolymers thereof, ultraviolet radiation may be used instead of γ-rays or high energy electrons.

In the preferred procedure to produce the electrodes of the invention, the hydrophilic groups are first grafted onto the fluorocarbon powder. This may be accomplished by irradiating according to the known techniques the hydrophobic polymer substratum e.g. PTFE powder, with exposures preferably in the range of 10–400 megarad from a Cobalt 60 source or an electron accelerator at a temperature which may vary within a relatively wide range from 15° to 150° C. in air or preferably in the presence of inorganic salts such as nitrites, cyanides, carbonates or others, either in solution or finely divided crystalline state. This procedure provides the PTFE matrix with hydrophilic groups resistant to the subsequent sintering treatments to produce the electrodes and examples of such groups are —COOR, —COX, —OR, —CN. The PTFE powder thus modified, after rinsing with enough water to remove the unreacted excess salt, is blended in an aqueous emulsion, dispersion or suspension with the powder of electrocatalytic material comprising platinum group metals and mixed oxides of said metals and valve metals, together if desired, with powders of one or more electroconductive materials.

The binder powder is present in the mixture in percentages varying from 18 and 30% by weight. The real active surface of the electrocatalytic material must be as high as possible with the surface area thereof preferably being at least 25 m$^2$/g, and more desirably between 50 and 150 m$^2$/g, as determined by the nitrogen absorption methods. The mixture, in aqueous emulsion or suspension, in a suitable medium free from surfactants is evenly spread onto a casting surface such as a metal foil, e.g. titanium and then raising the temperature high enough to evaporate the water from the emulsion.

Then, the resulting powder is covered with a thin aluminum foil and pressed in a heated mold at a suitable molding temperature, for example 350° C., under a molding or forming pressure, for example 1000-3000 psi, over a period of time long enough to cause the particles to sinter, usually varying between 1 and 4 minutes, the individual particles of the modified PTFE into a coherent film. The thin aluminum foil is then removed, suitably, by submerging the structure in a 10-20% sodium hydroxide solution.

The thin porous electrode thus formed, still supported on the titanium foil to allow easy handling, is then preferably applied onto the surface of the membrane, preferably hydrated or swelled with water to the extent required for cell electrolysis. The assembly is then pressed in a heated press at 280°-350° C. under a pressure of 1000-3000 psi for a time varying between 5 and 40 seconds under conditions which reduce or prevent water losses. This may be accomplished by pressing in an atmosphere having a high water pressure, by sealing the assembly in an envelope so that water cannot escape during pressing, or by pressing in a special mold to hold water in the assembly thereby preventing escape thereof. As soon as the article is removed from the press, it is quenched in cold water and the titanium foil is peeled off the electrode which remains embedded on the membrane surface.

In an alternative embodiment of the method for preparing the electrode of the invention, a thin porous layer is formed by sintering as described above a mixture of finely divided powders of polytetrafluoroethylene and electrocatalytic materials such as platinum metals and mixed oxides of said metals and valve metals, mixed if desired, with graphite powder or other electroconductive materials capable of withstanding the electrolysis conditions. The thin porous layer thus obtained on the titanium support, after leaching off the aluminum foil, is contacted with a suitable modifying agent capable of providing hydrophilic groups and subjected to radiation with exposures preferably in the range of 0.1-20 megarad from a Cobalt 60 source or an electron accelerator, or exposed to ultraviolet radiation corresponding to 50 W/cm$^2$ of electrodic surface, at temperatures that may vary within a relatively wide range from 15° to 150° C. At the end of the ionizing treatment, the electrode comprising the fluorinated binder now carrying the hydrophilic groups, is washed with abundant solvent and, if desired, dried, and is ready for application onto the surface of the ion-exchange membrane by hot-pressing at the typical conditions of 280°-350° C. and 1000-300 psi.

The alternative procedure of irradiating the preformed electrode allows grafting into the fluorinated matrix hydrophilic groups which would decompose at the sintering temperatures and this is possible because the high-temperature stage is very short, on the order of a few seconds, during the transfer of the electrode from the metal support to the membrane. The modifying agents capable of providing the hydrophilic groups belong to a very wide class of inorganic and organic species such as, for instance, air, ammonium carbonate, potassium nitrate, sodium nitrite, ammonium sulfite, sulfur, sulfur chloride, thionyl chloride, alkali or alkaline earth metal sulfides, xanthates, phosphorous trichloride, phosphoryl chloride, esters and anhydrides of phosphonic acid and other species which may provide hydrophilic groups such as —SCl, —SOCl,

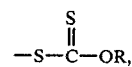

—POCl$_2$ and

or others, such of which, where certain circumstances and particular conditions, such as for instance reflux-treatment in alcoholic caustic solution, may provide phosphonic or sulphonic groups after the grafting thereof on the polymer matrix.

The preferred fluorinated polyolefin is PTFE because of its chemical inertness and mainly because of its thermal characteristics which make it exceptionally useful as binder in the manufacture of electrodes for solid polymer electrolyte cells. In fact, at the sintering temperature of about 350° C., PTFE does not flow significantly but retains a high viscosity which reduces the possibility of covering a too large portion of catalytic particles or of active surface of the electrodes during sintering. However, other homopolymers or copolymers derived from fluorinated monomers having also one chlorine, bromine or iodine atom such as for example polychloritrifluoroethylene (PCTFE) and polybromotrifluoroethylene (PBTFEe can be used satisfactorily in place of PTFE by reducing the sintering temperature and the duration of the forming process to account for the lower melting temperature and fluidity of these polymers as compared to PTFE.

The method of the invention for generating halogen by electrolysis of alkali metal brine comprises conducting the electrolysis with a cathode and an anode separated by an ion exchange membrane, said anode preferably being bonded to said membrane and comprising a porous layer of particles of electrically conductive and electrocatalytic material bonded together and to the surface of the membrane by a modified fluorinated polyolefin wettable by the alkali metal brine and maintaining an alkali metal brine with a salt concentration not lower than 150 g/l in contact with the anode. That is the hydrophilic surface of the binder has unobstructed access to or is in direct contact with the brine.

Preferably, the cathode is also bonded to the opposite side of the cation exchange membrane and comprises a thin porous layer of particles of electrically conductive and catalytic material bonded to the surface of the membrane. The binder used to bond the cathode may be the same modified fluorinated polyolefin used for the anode but it may also be an un-modified fluorinated polyolefin as fluorocarbon polymers are sufficiently wettable in the hot caustic liquor present in the cathodic compartment of the cell.

The concentration of the caustic liquor in contact with the cathode is maintained substantially constant by withdrawing concentrated liquor and adding diluted caustic or water into the cathode compartment. The preferred concentration depends on the characteristic of the type of cation exchange membrane used and usually falls within the limit of 25% to 40%.

The novel electrolysis cell is comprised of a housing containing an anode chamber containing an anode separated by an ion exchange membrane from a cathode chamber containing a cathode, means for introducing anolyte into the anode chamber, means for introducing catholyte into the cathode chamber, means for removing electrolysis products and means for impressing an electrolysis current, the said anode being comprised of a pulverulent electroconductive, electrocatalytic material bonded together with a fluoro-olefin polymer having a hydrophilic surface.

The membrane is preferably a stable, hydrated, cationic membrane which is characterized by ion transport selectivity and allows passage of positively charged sodium cations and minimizes passage of negatively charged anions. There are various types of ion exchange resins which may be fabricated into membranes to provide selective transport of the cation and two classes of such resins are the so-called sulfonic acid cation exchange resins and the carboxylic cation exchange resins. In the sulfonic acid exchange resins, which are the preferred type, the ion exchange groups are hydrated sulfonic acid radicals ($SO_3H \times H_2O$) which are attached to the polymer backbone by sulfonation. The ion exchanging acid radicals are not mobile within the membranes, but are fixedly attached to the backbone of the polymer ensuring that the electrolyte concentration does not vary.

Perfluorocarbon sulfonic acid cation membranes are preferred as they provide excellent cation transport, they are highly stable, they are not affected by acids and strong oxidants, they have excellent thermal stability, and they are essentially invariant with time. One specific class of cation polymer membranes which is preferred is sold by the Dupont Company under its trade designation—"Nafion", and these membranes are hydrated, copolymers of polytetrafluoroethylene (PTFE) and polysulfonyl fluoride vinyl ethers containing pendant sulfonic acid groups. These membranes may be used in hydrogen form which is customarily the way they are obtained from the manufacturer. The ion exchange capacity (IEC) of a given sulfonic cation exchange membrane is dependent upon the milli-equivalent weight (MEW) of the $SO_3$ radical per gram of dry polymer. The greater the concentration of the sulfonic acid radicals, the greater the ion exchange capacity and hence the capability of the hydrated membrane to transport cations. However, as the ion exchange capacity of the membrane increases, so does the water content and the ability of the membrane to reject salts decreases.

The rate at which sodium hydroxide migrates from the cathode to the anode side thus increases with IEC. This results in a reduction of the cathodic current efficiency (CE) and also results in oxygen generation at the anode with all the undesirable results that accompany that. Consequently, one preferred ion exchange membrane for use in brine electrolysis is a laminate consisting of a thin (2 mil thick) film of 1500 MEW, low water content (5-15%) cation exchange membrane, which has high salt rejection, bonded to a 4 mil or more film of high ion exchange capacity, 1100 MEW, with a Teflon cloth. One form of such a laminated construction is sold by the Dupont Company under the trade designation, Nafion 315. Other forms of laminates or constructions are available, Nafion 355, 376, 390, 227, 214, in which the cathode side consists of thin layer or film of low-water content resin (5 to 15%) to optimize salt rejection, whereas the anode side of the membrane is a high-water content film to enhance ion exchange capacity.

The ion exchange membrane is preferably prepared by soaking in caustic (3 to 8 M) for a period of one hour to fix the membrane water content and ion transport properties. In the case of a laminated membrane bonded together by a Teflon cloth, it may be desirable to clean the membrane or the Teflon cloth by refluxing it in 70% $HNO_3$ for three to four hours. The cathode side barrier layer should be characterized by low-water content on a water absorption persulfonic acid group basis. This results in more efficient anion (hydroxyl) rejection. By blocking or rejecting the hydroxyl ions, back migration of the caustic is substantially reduced, thereby increasing the current efficiency of the cell and reducing oxygen generation at the anode. In an alternative laminate construction, the cathode side layer of the membrane is chemically modified. The functional groups at the surface layer of the polymer are modified to have lower water absorption than the membrane in the sulfonic acid form.

This may be achieved by reacting a surface layer of the polymer to form a layer of sulfonamide groups. There are various reactions which can be utilized to form the sulfonamide surface layer. One such procedure involves reacting the surface of the Nafion membrane while in the sulfonyl fluroide form with amines such as ethylynediamine (EDA) to form the substituted sulfonamide membranes. This sulfonamide layer acts as a very effective barrier layer for anions. By rejecting the hydroxyl anions on the cathode side, obviously back migration of the caustic (NaOH) is substantially reduced.

In the following examples there are described several preferred embodiments to illustrate the invention. However, it should be understood that the invention is not intended to be limited to the specific embodiments.

EXAMPLE 1

An aqueous emulsion of about 60% by weight of finely divided polytetrafluoroethylene powder (Teflon T-30 as marketed by the Du Pont Co.) is admixed in a 1:7 ratio of Teflon T-30 with sodium cyanide and the mixture was exposed at room temperature to a 20 Megarad radiation from a cobalt 60 source while the mixture was in a parallelepiped vessel made of 2 adjacent plates of a radiation transparent material spaced 1 cm. apart. The irradiated finely divided Teflon powder was then rinsed with a large volume of water and was then divided into two portions.

The first portion was admixed with an electrocatalytic powder of mixed oxides of ruthenium, iridium and titanium prepared by the process of U.S. Pat. No. 3,778,307 with a weight ratio of 0.75:1.1.25:1 calculated as metal and a surface area of 120 m$^2$/g. The amount of Teflon in the mixture was 20% by weight of the total weight of the powder. The resulting aqueous dispersion was then spread onto a titanium foil and the water was removed by evaporation with the amount of the dried powders on the titanium plate corresponding to a load of about 30 mg/cm$^2$. The powder layer was then covered with an aluminum foil and the resulting sandwich-structure was placed between a pair of heated plates in a press and heated for 4 minutes at a temperature of 350° C. under a pressure of 2500 psi to effect the sintering of the irradiated Teflon particles thereby forming a coherent film which is a sintered electrode in the shape of a thin, about 150 μm thick, porous layer constituting the anode. The aluminum foil was then removed by immersing the structure in an 18% caustic solution for the time necessary to completely dissolve the aluminum.

The second portion of the aqueous emulsion of irradiated polytetrafluoroethylene powder was admixed with a 1:1 (by weight) mixture of powders of graphite and platinum black to obtain a mixture containing 18% by weight of Teflon. A sintered cathode was then prepared by the above procedure for the anode by pouring the aqueous dispersion of powders onto a titanium foil to obtain, after evaporating the water, a powder layer with a load of about 25 mg/cm$^2$, covering the resulting layer with an aluminum foil, pressing the sandwich-structure in a heated press at 2500 psi for 4 minutes at a temperature of 350° C. to sinter the Teflon particles to form a coherent film and finally dissolving the aluminum by leaching a caustic solution. The cathode thus prepared was in the shape of a thin, sintered layer with a thickness of about 80 μm.

The anode and cathode thus produced were then respectively bonded to each side of a hydrated Nafion 315-type cation-exchange membrane. (produced by E. I. du Pont) of a copolymer of tetrafluoroethylene and perfluorosulfonylethoxyvinylether. The composite structure, consisting of the anode, the cation-exchange hydrated membrane and the cathode included between the two titanium plates, was hot-pressed for 30 seconds under a pressure of 2500 psi at 300° C. with care being taken to prevent substantial loss of water from the membrane. After removal of the titanium foils, a composite structure was obtained representing the structure of a solid polymer electrolyte cell in the shape of an ion-exchange membrane bearing the electrodes bonded on opposite sides thereof (structure Ia).

For comparison, the procedure and the operational details above illustrated were repeated but omitting the step of irradiation of the Teflon powder, there was prepared and bonded onto each side of a similar hydrated Nafion 315-type cation-exchange membrane an anode and a cathode respectively comprising the same powders of conductive and electrocatalytic materials mixed with untreated Teflon powder in the same weight ratios. The structure (IIa) was then produced similar to structure Ia having as a binder, non-modified Teflon powder.

The two composite structures Ia and IIa consisting of the cation-exchange membranes bearing the electrodes bonded thereto were utilized in two identical cells for the electrolysis of sodium chloride brine. The electrodes were connected to the current-carrying means by open-mesh anodic and cathodic current distributors consisting of thin expanded sheets of platinized titanium and very fine-mesh stainless steel screens respectively. It was found that the membrane having the anode bonded with the irradiated polymer permitted a more ready penetration of anolyte into the pores of the anode than when a non-irradiated polymer was used. Further, the evolved chlorine had a lower oxygen content and the anode current efficiency was higher.

EXAMPLE 2

Using the procedure described in Example 1 for the formation of porous sintered electrodes, there were prepared: (a) an anode comprising mixed oxides of ruthenium, irridium and titanium in a weight ratio, referred to as the metals, of 0.75:0.25:1 and containing 20% by weight of non-modified Teflon and (b) a cathode consisting of a 1:1 (by weight) mixture of graphite and platinum black containing 18% by weight of non-modified Teflon. After dissolving the aluminum foils, the two sintered electrodes supported on the titanium plates had the following characteristics:

anode: thickness about 110 μm, load 26 g/m$^2$
cathode: thickness about 80 μm, load 31 g/m$^2$ The two sintered electrodes supported by the titanium casting plates were then immersed in dimethylphosphite and were given a 10 Mrd dose of radiation coming from a Cobalt 60 source at a temperature of about 60° C. The thus irradiated electrodes, after thorough rinsing with water followed by drying, were bonded to the opposite surfaces of a hydrated Nafion 315-type cation-exchange membrane in a heated press for 30 seconds at 300° C. under a pressure of 2500 psi, producing, after removing the titanium plates, a solid polymer electrolyte in the shape of a membrane carrying the electrodes bonded on each side thereof (structure Ib).

For comparison, two electrodes were prepared identical to the ones above described and bonded onto the surface of a hydrated Nafion 315 membrane, while omitting the step of irradiating in dimethylphosphite (structure IIb).

The two composite structures Ib and IIb, consisting of the cation-exchange membranes with the sintered electrodes bonded thereto, were utilized in two identical cells for the electrolysis of sodium chloride brine, as described above in Example 1. Again, as in Example 1, the membrane having the anode bonded with the irradiated polymer was found to permit a more efficient penetration of the anolyte inside the pores of the anode, than was the case of the non-irradiated electrode. A lower oxygen level was detected in the evolved chlorine as well as a higher anode current efficiency in the operation of the cell.

Various modifications of the apparatus and method of the invention may be made without departing from the spirit or scope thereof and it is to be understood that the invention is intended to be limited only as defined in the appended claims.

What I claim is:

1. An electrode comprising a pulverulent electroconductive, electrocatalytic material bonded together with a fluoroolefin polymer having a hydrophilic surface.

2. An electrode of claim 1 wherein the polymer is polytetrafluoroethylene.

3. An electrode of claim 1 wherein the polymer hydrophilic surface contains at least one member of the group consisting of —NO$_2$, —CN, —COX, —OR, —SO$_3$H, —COOR, —COOH, —OH, and X, R is alkyl of 1 to 7 carbon atoms and X is selected from the group consisting of bromine, chlorine and iodine.

4. An electrode of claim 1 bonded to a substrate.

5. An electrode of claim 4 wherein the substrate is a fluid-impervious, ion-exchange membrane.

6. An electrode of claim 1 wherein the hydrophilic surface is obtained by exposing the polymer to ionizing radiation from a Cobalt 60 source with a radiation dose from 10 to 400 Megarad in the presence of a prescursor substance of hydrophilic groups.

7. An electrode-membrane comprising a thin sheet of an ion-exchange membrane having bonded to one side thereof a layer of an electrode of claim 1.

8. An electrode-membrane of claim 7 wherein a second electrode is bonded to the opposite side of the membrane.

9. The electrode-membrane of claim 7 wherein the membrane is fluid impervious.

10. An electrode-membrane comprising a thin sheet of an ion-exchange membrane having bonded to one side thereof a layer of a pulverulent electro-conductive, electrocatalytic material bonded together with a fluoroolefin polymer having a hydrophilic surface, wherein the hydrophilic surface is obtained by exposing the polymer to ionizing radiation from a Cobalt 60 source with a radiation dose from 10 to 400 Megarad in the presence of a precursor substance of hydrophilic groups.

11. An electrolysis cell containing at least one cathode and at least one electrode-membrane of claim 7.

12. The electrolysis cell of claim 11 wherein the cathode is bonded to the membrane.

13. An electrolysis cell containing at least one cathode and at least one electro-membrane comprising a thin sheet of an ion-exchange membrane having bonded to one side thereof a layer of a pulverulent electro-conductive, electrocatalytic material bonded together with a fluoroolefin polymer having a hydrophilic surface, wherein the hydrophilic surface is obtained by exposing the polymer to ionizing radiation from a cobalt 60 source with a radiation dose from 10 to 400 Megarads in the presence of a precursor substance of hydrophilic groups.

14. A method of generating a halogen comprising electrolyzing an aqueous halide solution in electrolysis cell containing at least one anode and one cathode separated by an ion-permeable membrane in sheet form having an electrode of claim 1 as the anode bonded to one side thereof in layer form, circulating an anolyte and a catholyte through the respective chambers, applying an electrolysis voltage between the anode and the cathode and recovering electrolysis products from said respective chambers.

15. The method of claim 14 wherein the halogen is chlorine and the aqueous halide solution is aqueous sodium chloride.

16. The method of claim 14 wherein the membrane is a fluid impervious, cation-exchange membrane.

17. A method of generating a halogen comprising electrolyzing an aqueous halide solution in electrolysis cell containing at least one anode and one cathode separated by an ion-permeable membrane in sheet form having an electrode of claim 1 as the anode bonded to one side thereof in layer form, circulating an anolyte and a catholyte through the respective chambers, applying an electrolysis voltage between the anode and the cathode and recovering electrolysis products from said respective chambers, the hydrophilic surface being obtained by exposing the polymer to ionizing radiation from a Cobalt 60 source with a radiation dose from 10 to 400 Megarads in the presence of a precursor substance of hydrophilic groups.

* * * * *